Nov. 14, 1944.　　L. E. ALBERTSON ET AL　　2,362,606
FEEDER
Filed Sept. 18, 1941　　4 Sheets-Sheet 1

INVENTORS
LAWRENCE E. ALBERTSON
HENRY M. MUELLER
BY G. H. Braddock
ATTORNEY

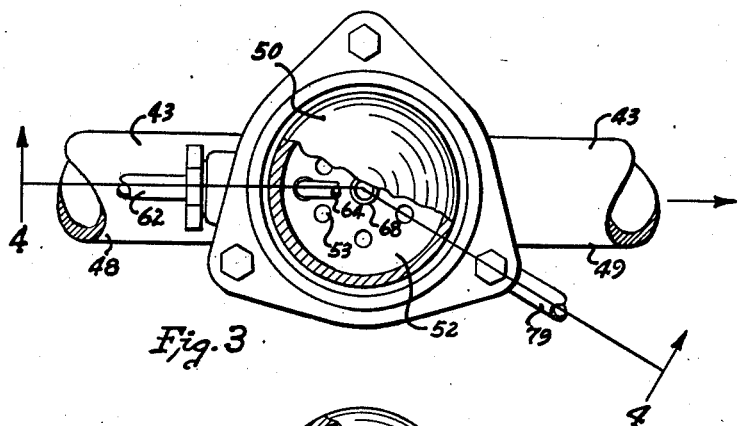
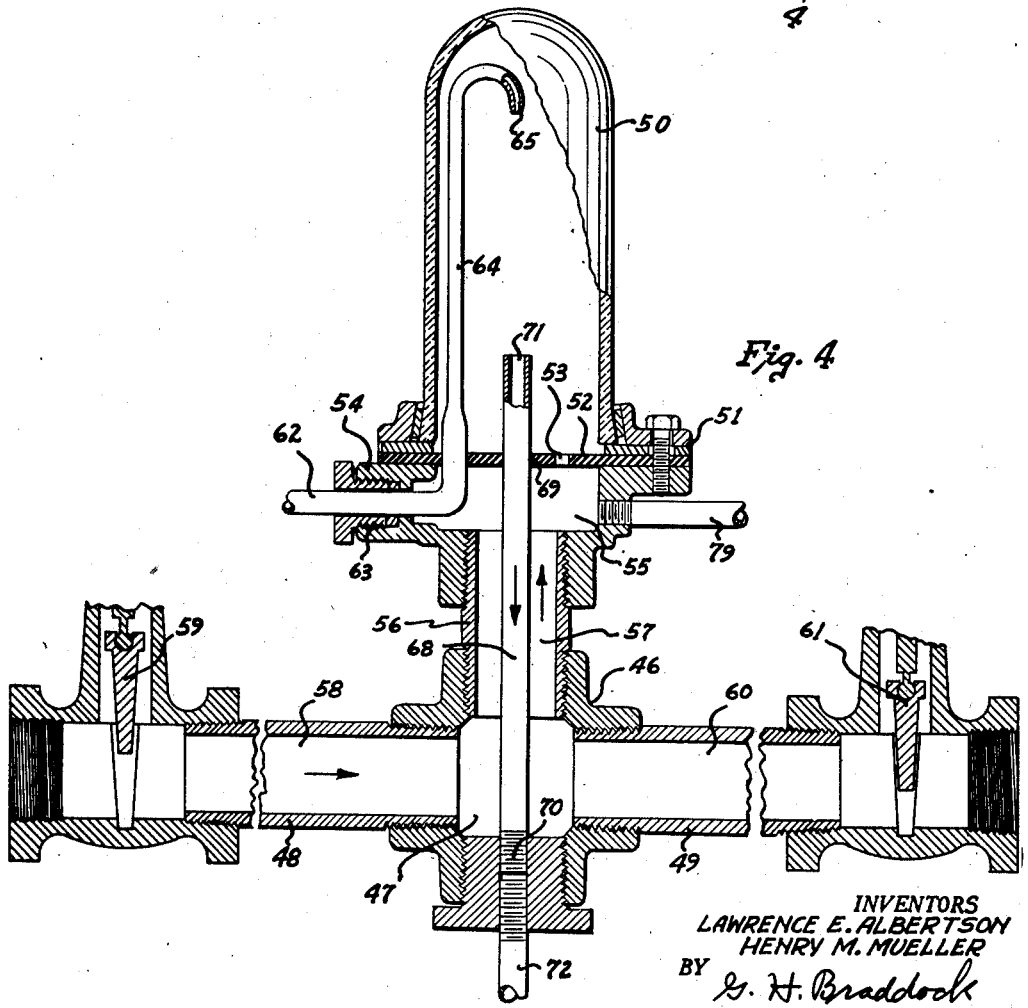

Patented Nov. 14, 1944

2,362,606

UNITED STATES PATENT OFFICE 2,362,606

FEEDER

Lawrence E. Albertson, St. Paul, and Henry M. Mueller, Minneapolis, Minn., assignors to The McKays Company, St. Paul, Minn., a corporation of Delaware Application September 18, 1941, Serial No. 411,354

33 Claims. (Cl. 210—31)

This invention has relation to a feeder apparatus for causing liquids from different sources under pressure to become intermingled in predetermined proportions and delivered as a mixture, or mixtures, of the intermingled liquids to a location, or locations, for use. There are many different liquids upon which the feeder apparatus can operate in commercial practice and cause to become mixed. Merely by way of example, said feeder apparatus can operate advantageously upon water and chlorine solution and cause these to become intermingled in predetermined proportions and delivered as a mixture, or mixtures, to a location, or locations, for use.

An object of the invention is to provide a feeder apparatus of the kind as stated which will be of novel and improved construction.

A further object is to provide a feeder apparatus wherein will be incorporated various improved features and characteristics of construction novel both as individual entities of the feeder apparatus and in combination with each other designed with the end in view of causing liquids from different sources under pressure to become intermingled in predetermined proportions and delivered as a mixture, or mixtures, of the intermingled liquids at a location, or locations, where said mixture, or mixtures, are to find use.

A further object is to provide a feeder apparatus which will include a vessel adapted to contain a liquid, such, for example, as water, under head pressure, a chamber in open relation to the vessel adapted to contain air under pressure of the liquid, or water, in said vessel, a reservoir in open relation to the chamber adapted to contain a liquid, such, for example, as chlorine solution, under pressure of the air in said chamber, and instrumentalities through the medium of which said liquids, or water and chlorine solution, can be caused to become intermingled in predetermined proportions and delivered to a location, or locations, for use.

A further object is to provide a feeder apparatus, for causing liquid substances from different sources under pressure to become intermingled in predetermined proportions and delivered as a mixture, or mixtures, of the intermingled liquid substances to a location, or locations, for use, which will be responsive in its operation to head pressure upon one of said liquid substances and to air under pressure of said head pressure upon another of the liquid substances.

A further object is to provide a feeder apparatus which will include a first quantity of liquid under head pressure, a second quantity of liquid under pressure of air existent by reason of said head pressure, and instrumentalities housing and interconnecting said first and second quantities of liquid so that liquid of one of said quantities is adapted to become intermingled with liquid of the other of said quantities in such manner that liquid of the different quantities, respectively, can be combined in predetermined proportions for delivery as a mixture, or mixtures, of liquids from the different quantities to a location, or locations, for use.

A further object is to provide a feeder apparatus which will include a vessel adapted to contain a quantity of a liquid under head pressure, a chamber in open relation to the vessel adapted to contain air under pressure of the liquid in said vessel, a reservoir in open relation to the chamber and isolated from the vessel adapted to contain a quantity of liquid under pressure of the air in said chamber, and instrumentalities through the medium of which said liquid under head pressure and said liquid under air pressure can be caused to become intermingled in predetermined proportions and delivered to a location, or locations, for use.

A further object is to provide a feeder apparatus of the nature as set forth, for causing liquids from different sources under pressure to become intermingled in predetermined proportions and delivered as a mixture, or mixtures, of the intermingled liquids to a location, or locations, for use, which will include a construction and arrangement for varying at will the relative proportions of the different liquids, respectively, of said mixture, or mixtures.

A further object is to provide a feeder apparatus of the present character which will include a novel and improved reservoir for a liquid and air under pressure constituted as an outer shell of the reservoir adapted to withstand the pressure of the liquid and air and an inner shell of the reservoir, within and desirably removable from said outer shell, adapted to contain said liquid in such manner that the inner shell will be free of pressure.

A further object is to provide a feeder apparatus which will include a novel and improved construction and arrangement, or mixing chamber, for causing liquids from different sources under pressure to become intermingled.

A further object is to provide a feeder apparatus which will include a novel and improved construction and arrangement, or retention entity, for receiving and retaining for a considerable period of time liquids which the feeder apparatus may cause to become intermingled.

And a further object is to provide a feeder apparatus of construction as hereinafter explicitly set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 3 is an enlarged fragmentary plan view, partially in section, of a mixing chamber of the feeder;

Fig. 4 is a vertical sectional view, taken substantially as on line 4—4 in Fig. 3;

Figure 1:
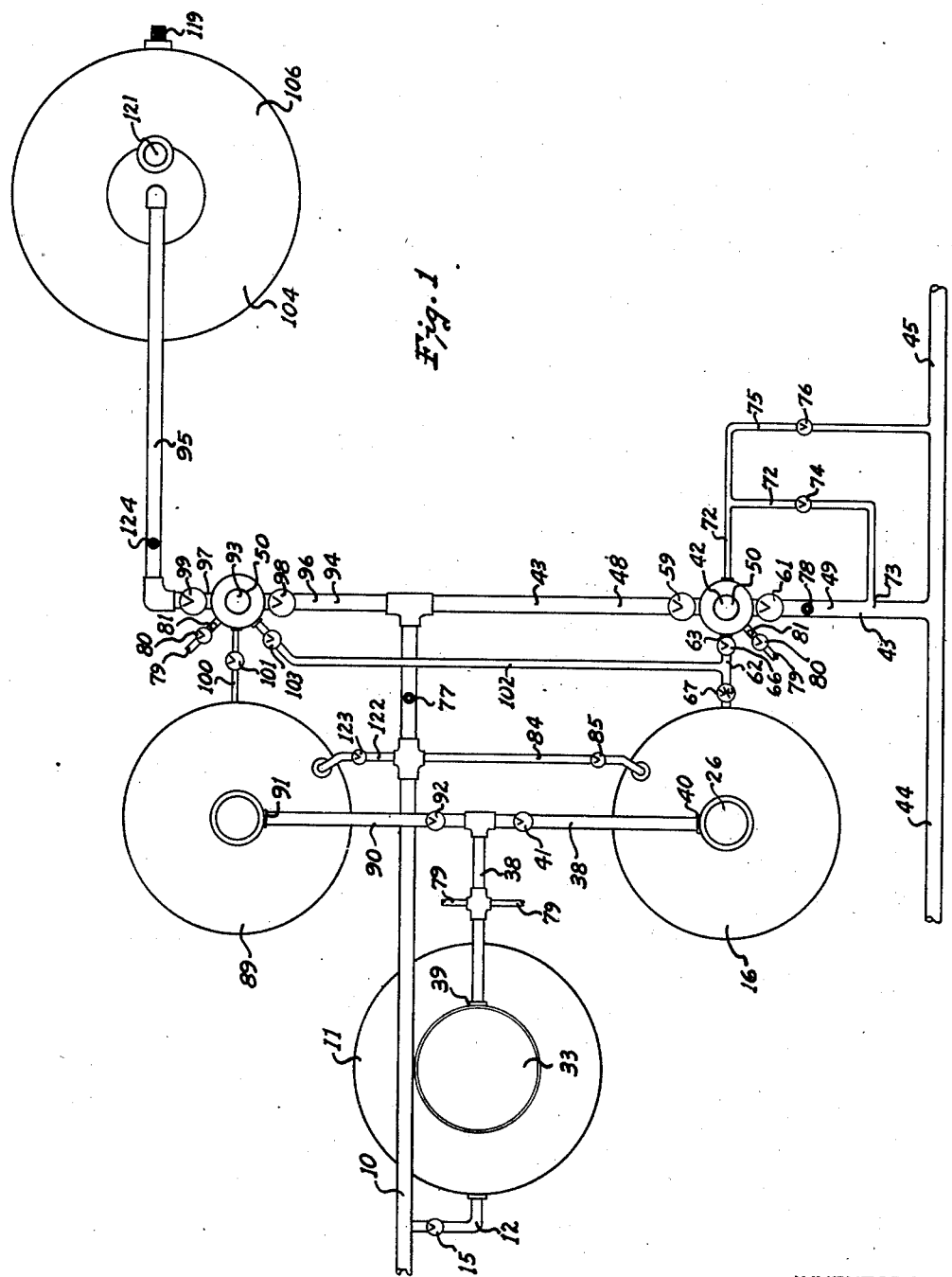
Fig. 1 is a diagrammatic view of a feeder made according to the principles of the invention.
Figure 2:
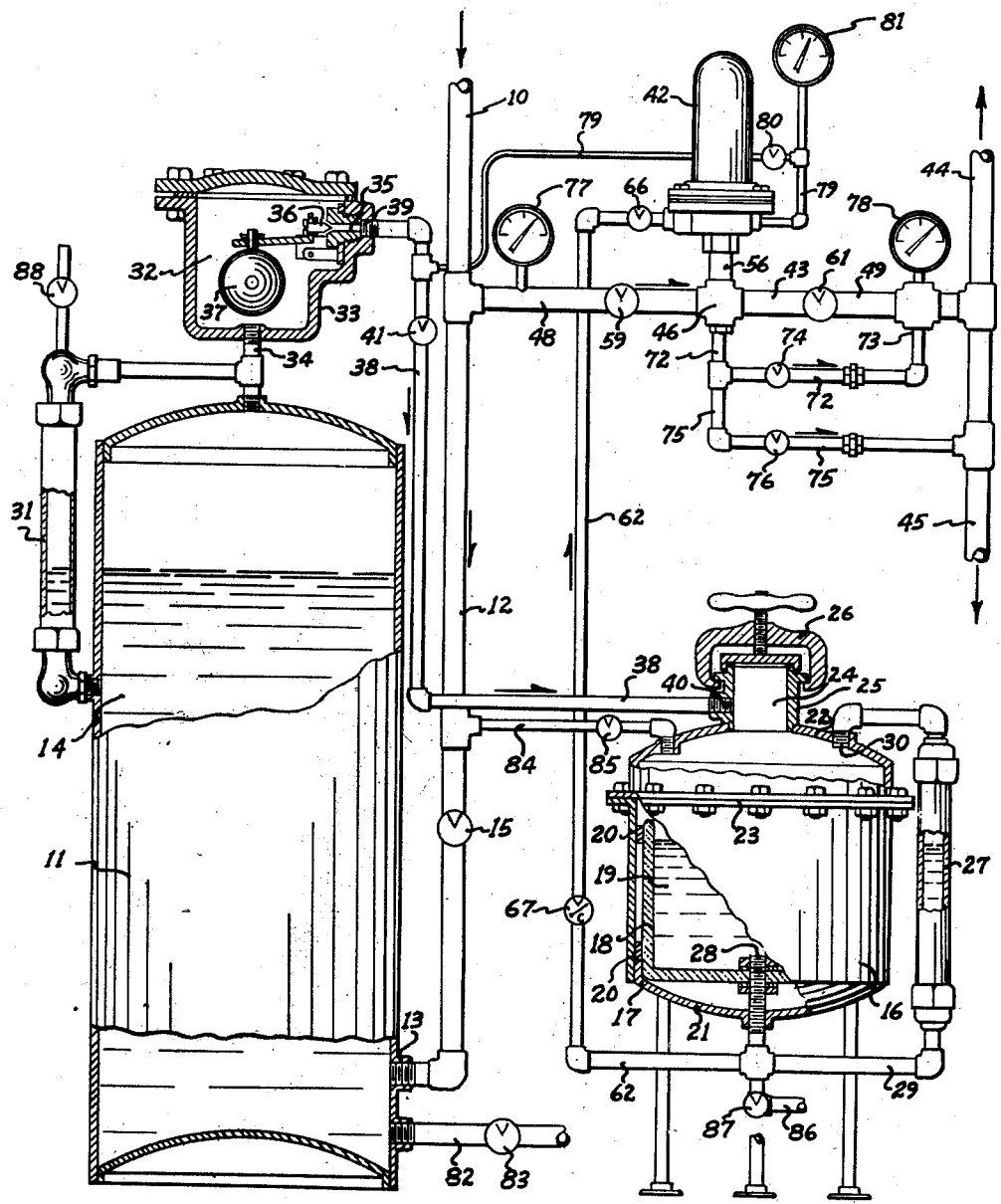
Fig. 2 is a fragmentary elevational view, partially in section, detailing features of the feeder.
Figure 5:
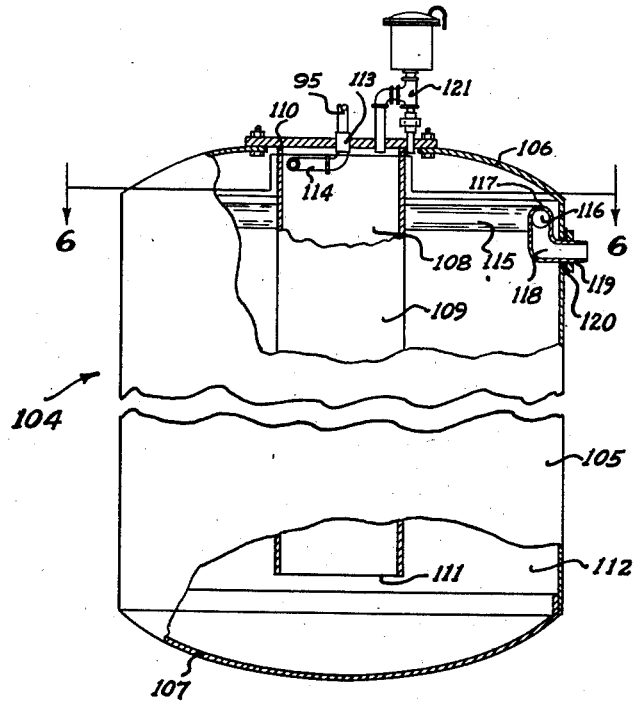
Fig. 5 is an enlarged elevational view, partially in section, of a retention entity of the feeder.
Figure 6:
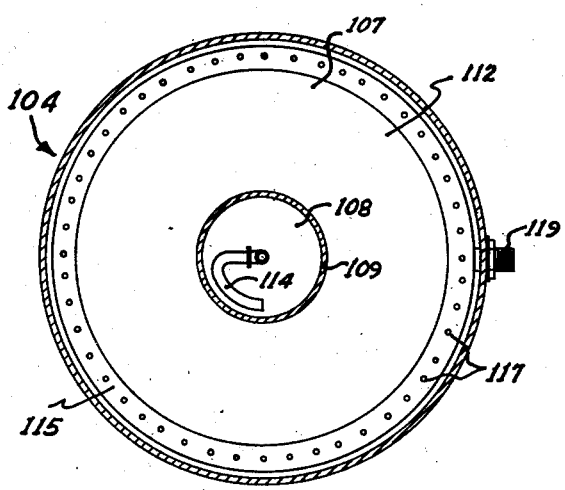
Fig. 6 is a sectional view of the retention entity, taken substantially as on line 6—6 in Fig. 5.

The present invention is susceptible of embodiment in various forms. A single embodiment is herein illustrated and described.

With respect to the drawings and the numerals of reference thereon, a supply pipe 10 is adapted to lead from a source (not shown) of liquid, such as water, under head pressure. A vessel 11 for liquid from the supply pipe 10 is connected with said supply pipe by a connecting pipe 12. As disclosed, the connecting pipe 12 enters a lower portion of the vessel 11 at 13. Said vessel 11 is adapted to receive liquid, or water, 14 from the supply pipe 10, and a manually actuable valve 15 in the connecting pipe 12 is for controlling flow of liquid or water into the vessel 11.

A reservoir 16 for a liquid, such as chlorine solution, and air under pressure is constituted as an outer shell 17 of the reservoir adapted to withstand the pressure of said liquid, or chlorine solution, and air and an inner shell 18 of the reservoir, within and removable from the outer shell 17, adapted to contain the liquid, or chlorine solution, in such manner that said inner shell will be free of pressure. More explicity, the inner shell 18 is as shown an open top receptacle having closed bottom and sides, and the liquid, or chlorine solution, denoted 19, housed by the reservoir 16 is contained in said receptacle. Said inner shell or receptacle 18 is supported, as at 20, in spaced relation to the outer shell 17. The reservoir 16 is adapted to contain air under pressure, and the construction and arrangement are such that air pressue upon all parts of the inner shell or receptacle 18 and its included liquid, or chlorine solution, 19 will be equal. That is, air under pressure in the outer shell 17 of the reservoir 16 is adapted to substantially completely surround the inner shell or receptacle 18 and its included liquid 19. Desirably, said inner shell or receptacle 18 may be composed of stone, or equivalent material, or other substance not readily attacked by the liquid within the reservoir 16.

In order that the inner shell or receptacle 18 of the reservoir 16 may be readily removable from the outer shell 17, said outer shell is constituted as a lower hollow member 21 and an upper hollow member 22 removably secured together in fluid-tight fashion, as at 23. The liquid, or chlorine solution, 19 is adapted to be placed in the inner shell or receptacle 18 through an opening 24 of a neck 25 upon an upper portion of the upper hollow member 22, and a removable closure member 26 is for effectively covering the opening 24. It will be evident that the inner shell or receptacle 18 is so situated within the outer shell 17 of the reservoir 16 that equal pressure will be exerted upon all surfaces, inside and outside, of said inner shell or receptacle. No pressure strains will be imposed upon the inner shell or receptacle.

Desirably, the construction and arrangement will be such that the level of liquid, or chlorine solution, 19 within the inner shell or receptacle 18 will be visible. To this end, a liquid level indicator, such as 27, may be provided. As disclosed, a lower portion of the interior of said inner shell or receptacle is in communication with the lower portion of the indicator 27 by way of an outlet connection 28 leading from the inner shell or receptacle to a liquid conveying connection joined to the lower portion of said indicator, and the upper portion of the indicator 27 is open at 30 to an upper portion of the interior of the outer shell 17.

The vessel 11 is also provided with a liquid level indicator, designated 31, of ordinary or preferred construction.

A chamber 32 in open relation to an upper portion of the vessel 11 is adapted to contain air under pressure of liquid, or water, 14 in said vessel, and hence under the head pressure of liquid, or water, in the supply pipe 10. More explicitly, the chamber 32 is provided by a hollow casing, denoted generally at 33, which is fluid-tight save for an air conveying connection 34 leading from the upper portion of the interior of the vessel 11 into the lower portion of said chamber 32 and a valve controlled outlet 35 leading from an upper portion of the chamber. A needle valve 36 for controlling the outlet 35 is itself controlled by a float 37 within the hollow casing 33. The construction and arrangement are such that the needle valve 36 is normally in the open condition of the outlet 35, and that said needle valve will cause said outlet to become sealed closed upon the entrance of liquid, or water, 14 into said hollow casing 33 from the vessel 11. That is, air under pressure is adapted to freely pass from the chamber 32 through the outlet 35, but liquid is precluded from passing said outlet due to the fact that with rising of liquid in the hollow casing 33 to the elevation of the float 37 said float will be actuated to cause the needle valve 36 to seal said outlet 35 closed.

The interior of the reservoir 16 is adapted to be in open relation to the chamber 32, by way of the outlet 35 when the needle valve 36 is in the open condition of said outlet, through the medium of a connecting pipe 38 for air which leads, at 39, from the outlet 35 and enters, at 40, an upper portion of the interior of the outer shell 17 of the reservoir 16. As disclosed, the connecting pipe 38 for air enters the neck 25 of the outer shell of the reservoir, but could communicate with the interior of said reservoir at location other than as illustrated. A manually actuable valve 41 in the connecting pipe 38 is for controlling passage of air under pressure from the chamber 32 to the interior of the reservoir 16.

It will be observed that the reservoir 16 is isolated from the vessel 11 in such manner that there is no possibility for interchange of the liquid 14 and the liquid 19 between said vessel and reservoir. That is, no liquid can possibly flow from the vessel 11 to the reservoir 16, or from said reservoir to said vessel. Air when under pressure within the chamber 32, the connecting pipe 38 and the interior of the outer shell 17 will effectively preclude passage of liquid between said chamber and reservoir, and upon dissipation of air from the vessel 11 so that the level of the liquid, or water, 14 rises to the elevation of the float 37, the needle valve 36 will effectively cut off passage between said chamber and said reservoir.

A construction and arrangement of the feeder apparatus for causing liquids, such as the liquid under head pressure in the supply pipe 10 and the liquid 19 in the reservoir 16, from different sources under pressure to become intermingled in predetermined proportions and delivered as a mixture, or mixtures, of the intermingled liquids at a location, or locations, where the mixture, or mixtures, is to find use includes a mixing chamber, represented generally at 42, and both said supply pipe 10 and the outlet connection 28 from the inner shell or receptacle 18 of said reservoir 16 are appropriately connected with said mixing chamber 42.

More explicitly, a continuation 43 of the supply pipe 10 leads to liquid outlet connections, denoted 44 and 45, respectively. A hollow fitting 46 intermediate the ends of the continuation 43 includes a passage 47 of said hollow fitting which affords communication between branches or sections 48 and 49 of said continuation, and said passage 47 is disposed directly below the mixing chamber 42 in the disclosure as made.

In the illustrated embodiment of the invention, said mixing chamber 42 is constituted as an inverted, elongated hollow member 50 of transparent material, such as glass, closed at its upper portion and sealed, as at 51, in fluid-tight manner around the margin of its open bottom to a partition 52 constituting the base of the mixing chamber 42. Said partition 52 extends across the open bottom of the hollow member 50 and separates the interior of said hollow member from the passage 47 save for a series of perforations 53 through the partition. The transparent hollow member 50 with perforated partition 52, which together provide the mixing chamber 42, are supported in fluid-tight manner by a hollow fitting 54 including a concavity 55 contiguous with the under or outer side of said partition 52, and said hollow fitting 54 is itself supported in fluid-tight manner by a coupling 56 having a passage 57 affording communication between the passage 47 and the concavity 55. The coupling 56 is connected to and supported upon the hollow fitting 46 in fluid-tight fashion. The passage 58 through the branch or section 48 of the continuation 43 of the supply pipe 10 is adapted to be adjustably controlled by a manually actuable valve 59, disclosed as a gate valve, which is situated at the side of the passage 47 adjacent the supply pipe 10, and the passage 60 through the branch or section 49 of said continuation 43 is adapted to be adjustably controlled by a manually actuable valve 61, also disclosed as a gate valve, which is situated at the side of said passage 47 adjacent the outlet connections 44 and 45.

A feed pipe 62 for the liquid, or chlorine solution, 19 leads from the outlet connection 28 and enters the hollow fitting 54 in fluid-tight manner, as at 63, and said feed pipe 62 merges at its end spaced from said outlet connection 28 into a nozzle 64 which extends upwardly through or past the partition 52 and includes an outlet 65 terminating in an upper portion of the transparent hollow member 50, within the mixing chamber 42, at considerably spaced relation to the partition 52. The amount or rate of feed of said liquid, or chlorine solution, 19 from the reservoir 16 to the outlet 65 of the nozzle 64 is adapted to be adjustably controlled and regulated by a manually actuable valve 66 in the feed pipe 62. A check valve 67 in said feed pipe 62 is for an obvious purpose.

A discharge pipe 68 for liquid leads from the mixing chamber 42. As disclosed, said discharge pipe 68 extends through the concavity 55 of the hollow fitting 54, the passage 57 of the coupling 56, and the passage 47 of the hollow fitting 46 in spaced relation to the side wall of said hollow fitting 54 bounding said concavity 55, as well as in spaced relation to the side wall of said coupling 56 defining said passage 57 and the side boundaries of said passage 47. An upper end portion 69 of the discharge pipe 68 is snugly fitted, centrally as shown, in the perforated partition 52, and a lower end portion 70 of said discharge pipe, below the passage 47, is fitted in fluid-tight manner into a lower or outer portion of the hollow fitting 46. The upper, open end 71 of said discharge pipe 68 is disposed within a lower portion of the mixing chamber 42 at location somewhat above the elevation of the perforated partition 52 and considerably below the elevation of the outlet 65 from the nozzle 64, and a continuation, denoted 72, of the lower end of the discharge pipe 68 is in open communication with said discharge pipe and assembled in fluid-tight fashion with the hollow fitting 46. The continuation or pipe connection 72 of the discharge pipe 68 leads to a portion 73 of the branch or section 49 of the pipe connection or continuation 43 at location between the gate valve 61 and the outlet connection 44, and a manually actuable valve in said continuation or pipe connection 72 is denoted 74. A pipe connection 75 leads from the continuation or pipe connection 72 to the outlet connection 45, and a manually actuable valve in said pipe connection 75 is denoted 76. The amount or rate of flow of liquid through each of said branches 72 and 75 is adapted to be independently adjustably controlled and regulated through the medium of the valves 74 and 76, respectively.

A pressure gage in the supply pipe 10 or its branch of section 48 and disposed between said supply pipe and the gate valve 59 is denoted 77, and a pressure gage upon the branch or section 49 of said pipe connection 43 and disposed between the gate valve 61 and the outlet connections 44 and 45 is designated 78.

A pipe connection 79 for air leads from the connecting pipe 38 to the concavity 55 of the hollow fitting 54, and a manually actuable valve in said connection 79 for controlling passage of air from said connecting pipe 38 to said concavity 55 is denoted 80. A pressure gage upon a part of the pipe connection 79 between the valve 80 and the hollow fitting 54 is represented 81.

A drain pipe 82 leading from a lower portion of the vessel 11 includes a usual manually actuable control valve 83. Numeral 88 denotes a vent valve for said vessel 11.

A branch pipe 84 extending from the supply pipe 10 or the connecting pipe 12 to the upper portion of the interior of the outer shell 17 of the reservoir 16 includes a usual manually actuable control valve 85, and a drain pipe 86 leading from the outlet connection 28 includes a usual manually actuable control valve 87.

To provide or replenish air under super atmospheric pressure in the upper portion of the vessel 11, and hence in the chamber 32 of the hollow casing 33, it is merely necessary to close valve 15, open drain valve 83 and vent valve 88, thus to cause said vessel 11 to be drained of liquid, and then close drain valve 83 and vent valve 88 and open valve 15 after the vessel is empty. Liquid, or water, under head pressure will flow from the supply pipe 10 through the connecting pipe 12 into said vessel 11 and cause a quantity of air to become trapped under pressure above the liquid, or water. Or, a constant air supply may be maintained within the chamber 32 through the instrumentality of mechanical or other means.

The feeder apparatus is adapted to cause liquid substances, such, for example, as water from the supply pipe 10 and chlorine solution 19 from the reservoir 16, from different sources under pressure to become intermingled in predetermined proportions in the mixing chamber 42 and delivered as a mixture, or mixtures, of the intermingled liquid substances to a location, or locations, as to the outlet connections 44 and/or 45, for use in response to head pressure upon one of the liquid substances, i. e., water from the supply pipe 10, and to air under pressure of said head pressure upon another of the liquid substances, i. e., chlorine solution in said reservoir 16.

When all of the outlet connections, such as 44 and 45, and valves 83, 88 and 87 of the feeder apparatus are closed and valves 15, 59, 61, 36, 41, 66, 74 and 76 of said apparatus are open, so that static conditions prevail, the pressure in the supply pipe 10, the vessel 11, the chamber 32, the reservoir 16, the mixing chamber 42 and the pipe connections and passages of the feeder apparatus will be the same.

When the valves 59 and 61 and either or both of the outlet connections 44 and 45 are open, flow of liquid, or water, from the supply pipe 10 through the pipe connection 43 to and out of the outlet connection or connections which may be open will evidently occur by reason of head pressure at the source of the liquid in said supply pipe.

When the valves 83, 88, 87, 80 and 85 are closed and the valves 15, 36, 41, 66, 74 and/or 76 and the outlet connections 44 and 45, or either of said outlet connections, are open, and assuming air under superatmospheric pressure in the chamber 32 and the reservoir 16, said air under pressure will evidently exert effort tending to cause flow of liquid, or chlorine solution, 19 from the receptacle 18 of said reservoir 16 through the feed pipe 62 and its nozzle 64 into the mixing chamber 42, and the discharge pipe 68 will provide an outlet passageway leading to the outlet connections 44 and 45 from said mixing chamber for any of said liquid, or chlorine solution, which may enter the mixing chamber. The gate valve 59, situated in the branch or section 48 of the pipe connection 43, is adapted to be adjusted to provide an opening past said gate valve which will cause a predetermined and intended differential in pressure to exist between the upstream and downstream sides of said opening with movement of liquid, or water, from the supply pipe 10 through said pipe connection 43 toward the outlet connections 44 and 45. More explicitly, the gate valve 59 is set, during practical operation of the feeder apparatus, so that the pressure in the mixing chamber 42, readable at the gage 81, will be somewhat less than the pressure in the supply pipe 10, readable at the gage 77. The amount of differential in pressure which exists at the upstream side of the gate valve 59, readable at said gage 77, and at the downstream side of said gate valve, readable at said gage 81, can of course be varied to have any predetermined value which may be intended by adjustment of the gate valve 59 to thus alter, increase or decrease, the size of the opening past said gate valve. Assuming valves 15, 36, 41 and 66 to be open, and air under superatmospheric pressure to be present in the system, it will be evident that with flow of liquid, or water, from the supply pipe 10 through the pipe connection 43 toward the outlet connections 44 and 45 there will be flow of liquid, or chlorine solution, from the receptacle 18 of the reservoir 16 through the feed pipe 62 and its nozzle 64 to the mixing chamber 42, caused by said air under pressure, when the gate valve 59 is set to cause the pressure within said mixing chamber to have value less than the pressure within said supply pipe 10, and hence within said reservoir 16. And it will also be evident that with increase of the differential in pressure readable at the gages 77 and 81 there will be proportionate increase in flow of liquid, or chlorine solution, from said receptacle 18 into the mixing chamber 42, and vice versa. Naturally, there will be increase of differential in pressure, discernible at said gages 77 and 81, with increase in the rate of flow of liquid, or water, from the supply pipe 10 through the pipe connection 43, and vice versa, and the rate of increase or decrease of differential in pressure will vary in proportion as there is increase or decrease in the rate of flow of liquid, or water, from said supply pipe 10 through said pipe connection 43. That is, the amount of liquid, or chlorine solution, caused to enter the mixing chamber 42 from the reservoir 16 will be directly proportional to the amount of liquid, or water, which is caused to flow from the supply pipe 10 through the pipe connection 43, no matter what may be the rate of speed of travel of the liquid, or water, from said supply pipe through said pipe connection. The liquid, or chlorine solution, fed to the mixing chamber 42 by way of the feed pipe 62 and its nozzle 64 from the reservoir 16 is caused to become intermingled with, and only with, the liquid, or water, which flows from the supply pipe 10 through the pipe connection 43. Evidently, upon union of the liquid, or chlorine solution, which enters said mixing chamber 42 from said reservoir 16 with the liquid, or water, which passes through said pipe connection 43 from said supply pipe 10, said liquids, water and chlorine solution, will be mixed together in precisely the proportions which were predetermined, regardless of the value of the differential in pressure discernible at the gages 77 and 81 during operation of the feeder apparatus.

The valve 66 in the feed pipe 62 is for controlling and regulating the amount of the flow of liquid, or chlorine solution, from the receptacle 18 through said feed pipe and its nozzle 64 into the mixing chamber 42. The capacity for flow of liquid through the feed pipe 62 will, naturally be increased with adjustment of the valve 66 toward open position and decreased with adjustment of said valve toward closed position.

The gate valve 61, situated in the branch or section 49 of the pipe connection 43, is adapted to be adjusted to provide an opening past said gate valve which will create a restriction in said branch or section 49 sufficient to cause a portion of the liquid, or water, flowing from the supply pipe 10 through said pipe connection 43 to be diverted into the mixing chamber 42, through the perforations 53 in the partition 52, by way of the passage 47, the passage 57 and the concavity 55, which passages and concavity are in surrounding relation to the discharge pipe 68. The amount of restriction provided at the gate valve 61 is readable at the pressure gage 78. Desirably, the combined cross sectional area of said perforations 53 will be made less than the cross sectional area of the passageway for liquid, constituted as said passages 47, 57 and concavity 55, between said pipe connection 43 and said mixing chamber, so that a jetting action will be imparted to the liquid, or water, as it enters the mixing chamber through its perforations. The liquid, or chlorine solution, which enters said mixing chamber 42 by way of the nozzle 64 falls to the general location of the upper, open end 71 of the discharge pipe 68 to there become mixed and thoroughly intermingled with the liquid, or water, which is jetted or sprayed into the mixing chamber through the perforations 53.

When the level of mixed liquids, water and chlorine solution, rises in the mixing chamber above the elevation of said upper, open end 71 of the discharge pipe 68, said mixed liquids will flow from said mixing chamber by way of said discharge pipe into the pipe connection 72 and thence to the outlet connections 44 and 45, assuming the valves 74 and 76 to be open. Thus, the portion of the liquid, or water, diverted from the pipe connection 43 to the mixing chamber 42 rejoins, and the liquid, or chlorine solution, fed to said mixing chamber through the feed pipe 62 joins, the main body of liquid, or water, on passage from the supply pipe 10 directly to the outlet connections.

The branch pipe connection 72 having the valve 74, and the branch pipe connection 75 having the valve 76, constitue means, or a construction and arrangement, of the feeder apparatus whereby the proportionate amounts of the liquids, water and chlorine solution, of the mixtures fed to outlet connections, respectively, such as 44 and 45, of said feeder apparatus can be adjustably varied. More explicitly, the intermingled liquids, water and chlorine solution, as they pass outwardly through the discharge pipe 68 from the mixing chamber 42 include the total amount of the liquid, or chlorine solution, 19 which passes the feeder apparatus and but a very small part or percentage of the liquid, or water, from the supply pipe 10 which passes said apparatus. During travel of said intermingled liquids from the mixing chamber to said outlet connections the intermingled liquids must pass either the valve 74, in the line between the discharge pipe 68 and the outlet connection 44, or the valve 76, in the line between said discharge pipe and the outlet connection 45. Evidently, by relative adjustment of said valves 74 and 76 the proportionate amounts of liquid, or chlorine solution, 19 from the reservoir 16 and of liquid, or water, from the supply line 10 constituting the mixtures, respectively, which are made to flow out of the outlet connections 44 and 45, respectively, can be adjustably varied. That is, with adjustment of the valve 74 toward open position and the valve 76 toward closed position there will be increase of the amount of liquid, or chlorine solution, 19 from the reservoir 16 to the amount of the liquid, or water, from the supply pipe 10 of the mixture which will flow out of the outlet connection 44 and decrease of the amount of said first mentioned liquid, or chlorine solution, to the amount of said second mentioned liquid, or water, of the mixture which will flow out of the outlet connection 45, and vice versa. Stated differently, with opening of the valve 74 and closing of the valve 76 there will be proportionate increase of flow of the liquid 19 to the outlet connection 44 and proportionate decrease of flow of said liquid 19 to the outlet connection 45, and vice versa.

In Fig. 1 of the drawings, there is disclosed a reservoir 89, which may be in all respects similar to the reservoir 16 and for the same purpose as said reservoir 16. The interior of said reservoir 89 is adapted to be in open relation to the chamber 32, provided by the hollow casing 33, through the medium of a connecting pipe 90 for air which leads from the connecting pipe 38 and enters, at 91, an upper portion of the interior of the reservoir 89. A manually actuable valve 92 in the connecting pipe 90 is for controlling passage of air under pressure from said chamber 32 to the interior of said reservoir 89.

A mixing chamber 93 is generally similar to the mixing chamber 42 and for the same purpose, and the supply pipe 10 and an outlet connection, similar to the outlet connection 28, from the reservoir 89 are connected to said mixing chamber 93 in about the manner as hereinbefore described.

A second continuation 94 of the supply pipe 10 leads to an outlet connection 95 for liquid, and a hollow fitting such as 46 is situated intermediate the ends of said second continuation 94, beneath the mixing chamber 93. Said hollow fitting includes a passage such as 47 which affords communication between branches or sections 96 and 97 of the second continuation 94. The transparent hollow member, such as 50, with perforated partition, such as 52, of the mixing chamber 93, are supported by a hollow fitting, such as 54, having a concavity, such as 55, and said last mentioned hollow fitting is supported by a coupling, such as 56, having a passage, such as 57. The coupling such as 56 is connected to and supported upon the hollow fitting such as 46 in the manner as hereinbefore set forth. The passage through the branch or section 96 of the second continuation 94 is adapted to be adjustably controlled by a manually actuable valve 98, equivalent to and for the same purpose as the manually actuable valve 59, and the passage through the branch or section 97 of said second continuation 94 is adapted to be adjustably controlled by a manually actuable valve 99, equivalent to and for the same purpose as the manually actuable valve 61.

A feed pipe 100 for the liquid, which may be other than chlorine solution or water, to be fed from the reservoir 89 is equivalent to and for the same purpose as the feed pipe 62 and leads from the outlet connection such as 28 of said reservoir 89 and merges in a nozzle such as 64 disposed in the mixing chamber 93. The amount or rate of feed of liquid from the reservoir 89 through the feed pipe 100 to the mixing chamber 93 is adapted to be adjustably controlled and regulated by a manually actuable valve 101, equivalent to the manually actuable valve 66, in said feed pipe 100.

A discharge pipe such as 68 for liquid leads from the mixing chamber 93 through a passageway adjacent said mixing chamber 93 provided by elements equivalent to those which provide the passageway surrounding the discharge pipe 68, constituted as the concavity 55, the passage 57 and the passage 47. Said discharge pipe such as 68 is assembled with the perforated partition, such as 52, of the mixing chamber and with the hollow fitting such as 46 below and adjacent to said mixing chamber 93 in the same general manner as before described, and a continuation of the discharge pipe such as 68 may lead to a portion of the branch or section 97 of the pipe connection or continuation 94 at location between the valve 99 and the outlet connection 95.

A branch pipe 122 extending from the supply pipe 10 to the upper portion of the interior of the reservoir 89 includes a manually actuable valve 123, and the outlet connection 95 is adapted to include a pressure gage (not shown) at 124.

The construction and arrangement are obviously such that the liquids from the supply pipe 10 and from the reservoir 89 can be caused to become intermingled in the mixing chamber 93 in predetermined proportions, thence to be delivered to the outlet connection 95, in the manner as hereinbefore recited.

A feed pipe 102 connects the feed pipe 62 with the mixing chamber 93, and a manually actuable valve 103 in said feed pipe 102 is for adjustably controlling and regulating the amount or rate of feed of liquid from the reservoir 16 to said mixing chamber 93. The feed pipe 102 terminates in a nozzle such as the nozzle 64 within the mixing chamber 93.

By reason of the provision of the feed pipe 102, a plurality of different liquids, additional to the liquid of the supply pipe 10, can be fed, from the reservoirs 16 and 89, to the mixing chamber 93, there to become separately and independently mixed with said liquid of said supply pipe, and the amount of the liquids fed to said mixing chamber 93 from each of said reservoirs 16 and 89, respectively, can be readily independently varied by appropriate adjustment of the valves 101 and 103.

The inverted, elongated hollow members 50 of the mixing chambers 42 and 93 are desirably constructed of transparent material in order that flow of the liquid out of the nozzles such as 64 and through the perforations such as 53 into said mixing chambers can be viewed. It is advantageous during practical operation of the feeder apparatus to maintain the level of liquid in the mixing chambers at elevation somewhat below that of the outlets such as 65 of the nozzles such as 64. Should the level of the liquid rise too high at some time or other, it can be forced down in response to entry of air under pressure from the chamber 32, by way of the pipe connections 79, the concavities such as 55 and the perforations such as 53, into the mixing chambers which will be caused by opening of the valves 80.

The reservoirs 16 and 89 can be caused to be flushed out with liquid from the supply pipe 10 by opening of the valves 85 and 123 in the branch pipes 84 and 122, respectively, and also opening of the drain pipes, such as 86, from said reservoirs.

The outlet connection 95 for liquid leads to a retention entity, denoted generally at 104, adapted to receive and retain for a considerable period of time liquids which the feeder apparatus may cause to become intermingled.

A liquid receiving tank of said retention entity 104, consisting of a continuous upstanding side wall 105, an upper wall 106 which meets and is joined with the upper end of the side wall at the outer margin of said upper wall, and a lower wall 107 which meets and is joined with the lower end of said side wall at the outer margin of said lower wall, is substantially closed.

A mixing compartment 108 of the retention entity is provided through the medium of a tubular member 109 which extends downwardly within the liquid receiving tank from the upper wall 106 toward the lower wall 107 and is as disclosed arranged at the longitudinal axis of said liquid receiving tank in spaced relation to its side wall 105. Said tubular member 109 is secured within the liquid receiving tank so that its upper end 110 is contiguous with the upper wall 106 of said tank, and the tubular member is of such length that its lower, open end 111 terminates in somewhat spaced relation to the lower wall 107 of said liquid receiving tank.

The liquid receiving tank and the tubular member 109 together provide a liquid retaining compartment 112 of the retention entity 104, said liquid retaining compartment being constituted as all of the space within said liquid receiving tank beneath and surrounding said tubular member.

The outlet connection 95 passes in fluid-tight manner, as at 113, through the upper wall 106 of the liquid receiving tank, and terminates in a part-annular nozzle 114 disposed within the upper end portion of the tubular member 109. The part-annular nozzle 114 is constructed and is situated relatively to the internal wall of the tubular member 109, defining the mixing compartment 108, so that the mixture of liquids introduced into said mixing compartment from said nozzle will enter the mixing compartment with a rotary, or spiral, or whirling motion designed to have tendency toward causing more intimate association of the liquids of said mixture.

An annular collector 115 is situated within an upper portion of the liquid retaining compartment 112, in surrounding spaced relation to the tubular member 109, and includes an annular concavity 116, spaced apart openings 117 through its upper portion leading to said annular concavity, and a discharge outlet 118, leading from said annular concavity 116, provided by an outlet pipe 119 integral or rigid with the body of said annular collector and passing in fluid-tight fashion, as at 120, out of the side wall 105 of the liquid receiving tank. Save for the spaced apart openings 117 and the discharge outlet 118 the annular collector 115 is closed.

The mixture of liquids which enters the mixing compartment 108 by way of the part-annular nozzle 114 passes downwardly through said mixing compartment and from the lower, open end 111 thereof into the lower portion of the liquid retaining compartment 112. Thence the mixture of liquids rises in the portion of said liquid retaining compartment which surrounds the tubular member 109.

The construction and arrangement are such that the mixture of liquids is drawn off from the retention entity 104 at location around the periphery of the upper portion of the liquid retaining compartment 112 of said retention entity. The purpose of the annular collector 115, situated in said liquid retaining compartment as stated and having openings 117 in its upper portion only, is to cause the mixture of liquids to be drawn off evenly and smoothly over the entire area of the liquid retaining compartment, thus to reduce liability of the occurrence of eddy currents, or other disturbances, in the body of the mixture of liquids in said liquid retaining compartment, as well as to insure that all of the mixture of liquids entering the retention entity will remain therein for a considerable period of time. The mixture of liquids is required to traverse substantially the full length of the liquid retaining compartment, as well as the full length of the mixing compartment, during its passage through the retention entity.

Upper portions of the mixing compartment 108 and the liquid retaining compartment 112, respectively, are suitably vented, as represented generally at 121, to insure that vapors and/or gases, which may possibly occur within the retention entity due to some cause or other, will be vented to the atmosphere. The device, such as 121, not necessary to be disclosed in detail, employed to accomplish venting of said retention entity 104 will include means of the general nature of the needle valve 36 and the float 37, or equivalent means, adapted to permit free passage of vapor and gas from the compartments 108 and 112 of the retention entity and to preclude the passage of liquid from said compartments.

What is claimed is:

1. In a feeder apparatus, a mixing chamber consisting of an inverted hollow member having a perforated bottom, means for feeding a first liquid into said inverted hollow member through its perforated bottom, a nozzle for feeding a second liquid into an upper portion of said inverted hollow member spaced from said perforated bottom, a discharge pipe leading from a portion of the hollow member between said perforated bottom and said nozzle, and means for accomplishing the feeding of controlled amounts of air into said mixing chamber.

2. In a feeder apparatus, instrumentalities for causing liquid substances from different sources under pressure to become intermingled in predetermined proportions, for delivery as a mixture of the intermingled liquid substances to a location for use, comprising a pipe connection for flow of one of said liquid substances from a source thereof under head pressure to said location of use, a chamber in which said liquid substances are adapted to be caused to become intermingled, means responsive to said head pressure for causing a portion of said one liquid substance to be continuously diverted from said pipe connection and fed into said chamber while a main body of said one liquid substance continues its passage toward said location, a reservoir adapted to contain another of said liquid substances, means for causing pressure of air under pressure of said head pressure to be exerted upon said other liquid substance in said reservoir, means for causing pressure within said chamber to have value less than the value of said head pressure, a connection between said reservoir and said chamber adapted to convey a portion of said other liquid substance from said reservoir to said chamber in response to the action of said pressure of air under pressure of said head pressure concurrently with the feeding of a portion of said one liquid substance into said chamber, and a discharge pipe leading from said chamber and connecting with a portion of said pipe connection at the side of the chamber opposite said source of supply of said one liquid substance for conveying portions of the liquid substances caused to become intermingled in said chamber to said pipe connection.

3. In a feeder apparatus, instrumentalities for causing a first and a second liquid substance from different sources under pressure to become intermingled in predetermined proportions, for delivery as a mixture of the intermingled liquid substances to a location for use, comprising a pipe connection for flow of said first liquid substance from a source thereof under head pressure to said location of use, a chamber in which the first and second liquid substances are adapted to be caused to become intermingled, means responsive to said head pressure for causing a portion of said first liquid substance to be continuously diverted from said pipe connection and fed into said chamber while a main body of the first liquid substance continues its passage toward said location, a reservoir adapted to contain said second liquid substance, means for causing pressure of air under pressure of said head pressure to be exerted upon the second liquid substance in said reservoir, means for causing pressure within said chamber to have value less than the value of said head pressure, a connection between said reservoir and said chamber adapted to convey a portion of the second liquid substance from the reservoir to the chamber in response to the action of said pressure of air under pressure of said head pressure concurrently with the feeding of a portion of the first liquid substance into said chamber, and a discharge outlet for conveying portions of the first and second liquid substances caused to become intermingled in said chamber out of said chamber.

4. In a feeder apparatus, instrumentalities for causing a first and a second liquid substance from different sources under pressure to become intermingled in predetermined proportions, for delivery as a mixture of the intermingled liquid substances to a location for use, comprising a pipe connection for flow of said first liquid substance from a source thereof under head pressure to said location of use, a chamber in which the first and second liquid substances are adapted to be caused to become intermingled, means responsive to said head pressure for causing a portion of said first liquid substance to be continuously diverted from said pipe connection and fed into said chamber while a main body of the first liquid substance continues its passage toward said location, a reservoir adapted to contain said second liquid substance, means for causing pressure of air under pressure of said head pressure to be exerted upon the second liquid substance in said reservoir, means for causing pressure within said chamber to have value less than the value of said head pressure, a connection between said reservoir and said chamber adapted to convey a portion of the second liquid substance from the reservoir to the chamber in response to the action of said pressure of air under pressure of said head pressure concurrently with the feeding of a portion of the first liquid substance into said chamber, and a discharge pipe leading from said chamber and connecting with a portion of said pipe connection at the side of the chamber opposite said source of said first liquid substance for conveying portions of the first and second liquid substances caused to become intermingled in said chamber to the pipe connection.

5. In a feeder apparatus, instrumentalities for causing a first and a second liquid substance from different sources under pressure to become intermingled in predetermined proportions, for delivery as a mixture of the intermingled liquid substances to a location for use, comprising a pipe connection for flow of said first liquid substance from a source thereof under head pressure to said location of use, a chamber in which the first and second liquid substances are adapted to be caused to become intermingled, means responsive to said head pressure for causing a portion of said first liquid substance to be continuously diverted from said pipe connection and fed into said chamber, a reservoir adapted to contain said second liquid substance, means for causing pressure of air under pressure of said head pressure to be exerted upon the second liquid substance in said reservoir, means for causing pressure within said chamber to have value less than the value of said head pressure, a connection between said reservoir and said chamber adapted to continuously convey a portion of the second liquid substance from the reservoir to the chamber in response to the action of said pressure of air under pressure of said head pressure concurrently with the feeding of a portion of the first liquid substance into said chamber, and a discharge outlet from said chamber for intermingled portions of said first and second liquid substances.

6. In a feeder apparatus, instrumentalities for causing a first and a second liquid substance from different sources under pressure to become intermingled in predetermined proportions, for delivery as a mixture of the intermingled substances to a location for use, comprising a pipe connection for flow of said first liquid substance from a source thereof under head pressure to said location of use, a chamber in which the first and second liquid substances are adapted to be caused to become intermingled, means responsive in its operation to said head pressure for causing a portion of said first liquid substance to be continuously diverted from said pipe connection and fed into said chamber while a main body of the first liquid substance continues its passage toward said location, a reservoir adapted to contain said second liquid substance, means for causing pressure of air under pressure of said head pressure to be exerted upon the second liquid substance in said reservoir, means for creating a predetermined differential in pressure between said head pressure and the pressure existent within said chamber so that said pressure within the chamber has value less than said head pressure, means for continuously conveying a portion of said second liquid substance from said reservoir to said chamber in response to the action of said pressure of air under pressure of said head pressure exerted upon the second liquid substance concurrently with the continuous feeding of a portion of the first liquid substance into said chamber, and a discharge outlet from said chamber for intermingled portions of said first and second liquid substances.

7. In a feeder apparatus, instrumentalities for causing a first and a second liquid substance from different sources under pressure to become intermingled in predetermined proportions, for delivery as a mixture of the intermingled substances to a location for use, comprising a pipe connection for flow of said first liquid substance from a source thereof under head pressure to said location of use, a chamber in which the first and second liquid substances are adapted to be caused to become intermingled, means responsive in its operation to said head pressure for causing a portion of said first liquid substance to be continuously diverted from said pipe connection and fed into said chamber while a main body of the first liqud substance continues its passage toward said location, a reservoir adapted to contain said second liquid substance, means for causing pressure of air under pressure of said head pressure to be exerted upon the second liquid substance in said reservoir, means for creating a predetermined differential in pressure between said head pressure and the pressure existent within said chamber so that said pressure within the chamber has value less than said head pressure, means for continuously conveying a portion of said second liquid substance from said reservoir to said chamber in response to the action of said pressure of air under pressure of said head pressure exerted upon the second liquid substance concurrently with the continuous feeding of a portion of the first liquid substance into said chamber, and a discharge pipe leading from said chamber and connecting with a portion of said pipe connection at the side of the chamber opposite said source of said first liquid substance for conveying portions of the first and second liquid substances caused to become intermingled in said chamber to the pipe connection.

8. The combination as specified in claim 3, and means for adjustably controlling the proportionate amounts of said first and second liquid substances caused to enter said chamber.

9. The combination as specified in claim 6, and means for adjustably controlling the proportionate amounts of said first and second liquid substances caused to enter said chamber.

10. The combination as specified in claim 5, and means for adjustably controlling the amount of said second liquid substance caused to be conveyed to said chamber.

11. The combination as specified in claim 7, and means for adjustably controlling the amount of said second liquid substance caused to be conveyed to said chamber.

12. In a feeder apparatus, a first pipe connection and a vessel adapted to contain a first liquid under head pressure, a second pipe connection for conveying a quantity of said first liquid to a location for use, an air receiving chamber in open relation to said vessel adapted to contain air under pressure of said first liquid, a reservoir in open relation to said air chamber adapted to contain a second liquid under pressure of air in said air chamber, a mixing chamber in which quantities of the first and second liquids are adapted to be caused to become intermingled, means responsive to said head pressure for causing a portion of said first liquid to be continuously diverted from said second pipe connection and fed into said mixing chamber, means for causing pressure within said mixing chamber to have value less than the value of said head pressure, means for conveying a quantity of said second liquid from said reservoir to said chamber in response to pressure of said air under pressure in said air chamber concurrently with the feeding of the first liquid into said mixing chamber, and a discharge outlet for portions of said first and second liquids caused to become intermingled in said mixing chamber leading from the mixing chamber by way of said second pipe connection to said location of use.

13. In a feeder apparatus, a first pipe connection and a vessel adapted to contain a first liquid under head pressure, a second pipe connection for conveying a quantity of said first liquid to a location for use, an air receiving chamber in open relation to said vessel adapted to contain air under pressure of said first liquid, a reservoir in open relation to said air chamber adapted to contain a second liquid under pressure of air in said chamber, a mixing chamber in which quantities of the first and second liquids are adapted to be caused to become intermingled, means responsive to said head pressure for causing a portion of said first liquid to be continuously diverted from said second pipe connection and fed into said mixing chamber, means for causing pressure within said mixing chamber to have value less than the value of said head pressure, means for conveying a quantity of said second liquid from said reservoir to said chamber in response to pressure of said air under pressure in said air chamber concurrently with the feeding of the first liquid into said mixing chamber, and a discharge pipe leading from said mixing chamber and connecting with a portion of said second pipe connection at the side of the mixing chamber opposite the source of said first liquid for conveying portions of the first and second liquids caused to become intermingled in said mixing chamber to the second pipe connection.

14. In a feeder apparatus, a first pipe connection and a vessel adapted to contain a first liquid under head pressure, a second pipe connection for conveying a quantity of said first liquid to a location for use, an air receiving chamber in open relation to said vessel adapted to contain air under pressure of said first liquid, a reservoir in open relation to said air chamber adapted to contain a second liquid under pressure of air in said air chamber, a mixing chamber in which quantities of the first and second liquids are adapted to be caused to become intermingled, means responsive in its operation to said head pressure and constituted as a restriction in said pipe connection for causing a quantity of said first liquid to be continuously diverted from said second pipe connection and fed into said mixing chamber while a main body of the first liquid continues its passage toward said location, means for regulating flow of said first liquid through a portion of said second pipe connection at the head pressure side of said mixing chamber thus to create a predetermined differential in pressure between said head pressure and the pressure existent within said mixing chamber so that said pressure within the mixing chamber has value less than said head pressure, means for conveying a quantity of said second liquid from said reservoir to said mixing chamber in response to the action of pressure of said air in said air chamber concurrently with the feeding of the first liquid into said mixing chamber, and a discharge pipe leading from said mixing chamber and connecting with a portion of said second pipe connection at the side of the mixing chamber and the restriction opposite the source of supply of said first liquid for conveying portions of the first and second liquids caused to become intermingled in said mixing chamber to the second pipe connection.

15. The combination as specified in claim 14, and means for adjustably controlling the proportionate amounts of said first and second liquids caused to enter said mixing chamber.

16. The combination as specified in claim 14, and means for adjustably controlling the amount of said second liquid caused to be conveyed to said mixing chamber.

17. In a feeder apparatus, a pipe connection leading from a source of supply of a first liquid under head pressure to locations for use of mixtures of liquids, a mixing chamber, means for causing portions of said first liquid to be continuously diverted from said pipe connection to said mixing chamber while a main body of the first liquid continues to pass toward said locations, a reservoir housing a second liquid, means for causing pressure of air under pressure of said head pressure to be exerted upon said second liquid, means for conveying a quantity of said second liquid to said mixing chamber from said reservoir, a discharge pipe for the flow of the first and second liquids from said mixing chamber, branch pipes leading separately from said discharge pipe to different portions of said pipe connection each at the side of the mixing chamber opposite the source of supply of the first liquid, and means for independently adjustably controlling the passage of liquid through each of said branch pipes.

18. The combination as specified in claim 17, and means for adjustably controlling the proportionate amounts of said first and second liquids caused to enter said mixing chamber.

19. In a feeder apparatus, instrumentalities for causing a first, second and third liquid substance from different sources under pressure to become intermingled in predetermined proportions, for delivery as a mixture of the intermingled liquid substances to a location for use, comprising a pipe connection for flow of said first liquid substance from a source thereof under head pressure to said location of use, a chamber in which the first, second and third liquid substances are adapted to be caused to become intermingled, means responsive in its operation to said head pressure for causing a portion of said first liquid substance to be continuously diverted from said pipe connection and fed into said chamber while a main body of the first liquid substance continues its passage toward said location, a first reservoir adapted to contain said second liquid substance, means for causing pressure of air under pressure of said head pressure to be exerted upon the second liquid substance in said first reservoir, a second reservoir adapted to contain said third liquid substance, means for causing pressure of air under pressure of said head pressure to be exerted upon the third liquid substance in said second reservoir, means for causing pressure within said chamber to have value less than the value of said head pressure, a connecting pipe between each of said reservoirs and said chamber adapted to continuously convey portions of the second and third liquid substances from the reservoirs to the chamber in response to the action of said pressure of air under pressure of said head pressure concurrently with the feeding of the first liquid substance into said chamber, and a discharge pipe leading from said mixing chamber and connecting with a portion of said pipe connection at the side of the mixing chamber opposite the source of supply of said first liquid substance for conveying portions of the first, second and third liquid substances caused to become intermingled in said mixing chamber to the pipe connection.

20. The combination as specified in claim 19, and means for adjustably controlling the proportionate amounts of said first, second and third liquid substances caused to enter said chamber.

21. The method of mixing a first and a second liquid substance in predetermined proportions and delivering said substances when mixed to a location for use, consisting of the steps as follows: applying head pressure to said first liquid substance, utilizing said head pressure to force flow of said first liquid substance toward said location of use, creating a predetermined differential in pressure between said head pressure and pressure existent within a mixing chamber for said first and second liquid substances so that the pressure within said mixing chamber has value less than said head pressure, continuously diverting a portion of said first liquid substance from a main body of the first liquid substance flowing toward said location of use to said mixing chamber, conveying a portion of said second liquid substance to said mixing chamber in response to pressure of air under pressure of said head pressure concurrently with the feeding of a portion of said first liquid substance to said mixing chamber, and conveying portions of the first and second liquid substances from said mixing chamber to said main body of said first liquid substance at the side of the mixing chamber opposite the head pressure applied to said first liquid substance.

22. The method of mixing a first and a second liquid substance in predetermined proportions and delivering said substances when mixed to a location for use, consisting of the steps as follows: applying head pressure to said first liquid substance, utilizing said head pressure to force flow of said first liquid substance toward said location of use, creating a predetermined differential in pressure between said head pressure and pressure existent within a mixing chamber for said first and second liquid substances so that the pressure within said mixing chamber has value less than said head pressure, continuously diverting a portion of said first liquid substance from a main body of the first liquid substance flowing toward said location of use to said mixing chamber in response to said differential in pressure between said head pressure and pressure existent within said mixing chamber, conveying a portion of said second liquid substance to said mixing chamber by utilization of pressure of air under pressure of said head pressure concurrently with the feeding of a portion of said first liquid substance to said mixing chamber, and conveying portions of the first and second liquid substances from said mixing chamber to said main body of said first liquid substance at the side of the mixing chamber adjacent said location of use and opposite the head pressure applied to said first liquid substance.

23. The method as specified in claim 21, and adjustably controlling the proportionate amounts of said first and second liquid substances conveyed to said mixing chamber.

24. The method as specified in claim 22, and adjustably controlling the amount of said second liquid substance conveyed to said mixing chamber.

25. The method of mixing a first and a second liquid substance in predetermined proportions and delivering said substances when mixed to different locations for use, consisting of the steps as follows: applying head pressure to said first liquid substance, utilizing said head pressure to force flow of said first liquid substance toward said locations of use, creating a predetermined differential in pressure between said head pressure and pressure existent within a mixing chamber for said first and second liquid substances so that the pressure within said mixing chamber has value less than said head pressure, continuously diverting a portion of said first liquid substance from a main body of the first liquid substance flowing toward said location of use to said mixing chamber in response to said differential in pressure between said head pressure and pressure existent within said mixing chamber, conveying a portion of said second liquid substance to said mixing chamber by utilization of pressure of air under pressure of said head pressure concurrently with the feeding of a portion of said first liquid substance to said mixing chamber, conveying portions of the first and second liquid substances from said mixing chamber to different portions of said main body of said first liquid substance at the side of the mixing chamber adjacent said locations of use and opposite the head pressure applied to said first liquid substance, and independently adjustably controlling the passage of the mixed liquid substances from said mixing chamber to each of said different portions of said main body of the first liquid substance.

26. The method as specified in claim 25, and adjustably controlling the proportionate amounts of said first and second liquid substances conveyed to said mixing chamber.

27. The method of mixing a first, second and third liquid substance in predetermined proportions and delivering said substances when mixed to a location for use, consisting of the steps as follows: applying head pressure to said first liquid substance, utilizing said head pressure to force flow of said first liquid substance toward said location of use, creating a predetermined differential in pressure between said head pressure and pressure existent within a mixing chamber for said first, second and third liquid substances so that the pressure within said mixing chamber has value less than said head pressure, continuously diverting a portion of said first liquid substance from a main body of the first liquid substance flowing toward said location of use to said mixing chamber in response to said differential in pressure between said head pressure and pressure existent within said mixing chamber, conveying a portion of said second liquid substance to said mixing chamber by utilization of pressure under pressure of said head pressure, conveying a portion of said third liquid substance to said mixing chamber by utilization of pressure of air under pressure of said head pressure, and conveying portions of said first, second and third liquid substances from said mixing chamber to said main body of said first liquid substance at the side of the mixing chamber adjacent said location of use and opposite the head pressure applied to said first liquid substance.

28. The method as specified in claim 27, and adjustably controlling the proportionate amounts of said first, second and third liquid substances conveyed to said mixing chamber.

29. The method as specified in claim 27, and separately and independently mixing portions of said second and third liquid substances, respectively, as fed to said mixing chamber with portions of said first liquid substance in the mixing chamber.

30. The combination as specified in claim 19, and spaced apart nozzles within said chamber including a nozzle leading from each of said connecting pipes.

31. In a feeder apparatus, instrumentalities for causing liquid substances from different sources under pressure to become intermingled in predetermined proportions, for delivery as a mixture of the intermingled liquid substances to a location for use, comprising a pipe connection for flow of one of said liquid substances from a source thereof under head pressure to said location of use, a chamber in which said liquid substances are adapted to be caused to become intermingled, means responsive to said head pressure for causing a portion of said one liquid substance to be continuously diverted and fed into said mixing chamber while a main body of said one liquid substance continues its passage toward said location, a reservoir adapted to contain another of said liquid substances, means for causing pressure of air under pressure of said head pressure to be exerted upon said other liquid substance in said reservoir, means for causing pressure within said chamber to have value less than the value of said head pressure, a connection between said reservoir and said chamber adapted to convey a portion of said other liquid substance from said reservoir to said chamber in response to the action of said pressure of air under pressure of said head pressure, and a discharge pipe leading from said chamber and connecting with a portion of said pipe connection at the side of the chamber opposite said source of supply of said one liquid substance for conveying portions of the liquid substances caused to become intermingled in said chamber to said pipe connection.

32. In a feeder apparatus, a first pipe connection and a vessel adapted to contain a first liquid under head pressure, a second pipe connection for conveying a quantity of said first liquid to a location for use, an air receiving chamber in open relation to said vessel adapted to contain air under pressure of said first liquid, a reservoir in open relation to said air chamber adapted to contain a second liquid under pressure of air in said air chamber, a mixing chamber in which quantities of the first and second liquids are adapted to be caused to become intermingled, means responsive to said head pressure for causing a portion of said first liquid to be fed into said mixing chamber, means for causing pressure within said mixing chamber to have value less than the value of said head pressure, means for conveying a quantity of said second liquid from said reservoir to said chamber in response to pressure of said air under pressure in said air chamber, and a discharge outlet for portions of said first and second liquids caused to become intermingled in said mixing chamber leading from the mixing chamber by way of said second pipe connection to said location of use.

33. In a feeder apparatus, a first pipe connection and a vessel adapted to contain a first liquid under head pressure, a second pipe connection for conveying a quantity of said first liquid to a location for use, an air receiving chamber in open relation to said vessel adapted to contain air under pressure of said first liquid, a reservoir in open relation to said air chamber adapted to contain a second liquid under pressure of air in said air chamber, a mixing chamber in which quantities of the first and second liquids are adapted to be caused to become intermingled, means responsive to said head pressure for causing a portion of said first liquid to be fed into said mixing chamber, means for causing pressure within said mixing chamber to have value less than the value of said head pressure, means for conveying a quantity of said second liquid from said reservoir to said chamber in response to pressure of said air under pressure in said air chamber, and a discharge pipe leading from said mixing chamber and connecting with a portion of said second pipe connection at the side of the mixing chamber opposite the source of the first liquid for conveying portions of the first and second liquids caused to become intermingled in said mixing chamber to the second pipe connection.

LAWRENCE E. ALBERTSON.
HENRY M. MUELLER.